Jan. 12, 1926.
J. L. DIXON
1,569,464
ELECTROTHERMIC REFINING OF METALS
Filed Sept. 5, 1919
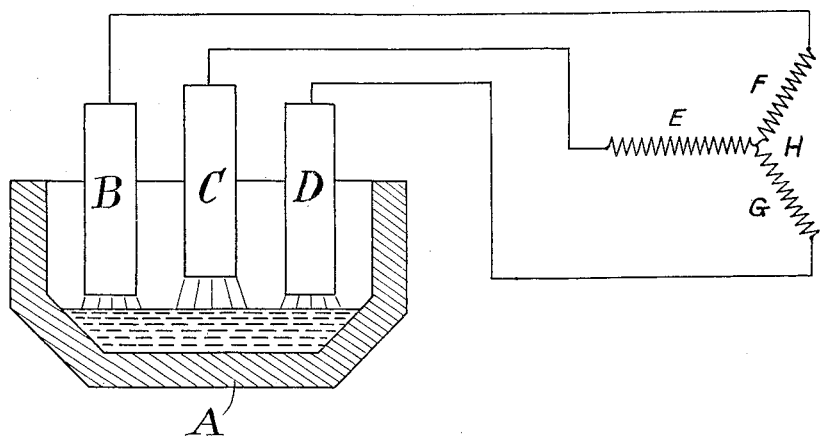
INVENTOR,
JOSEPH L. DIXON,
BY
ATTORNEYS Patented Jan. 12, 1926.

1,569,464

UNITED STATES PATENT OFFICE.

JOSEPH L. DIXON, OF NEW YORK, N. Y., ASSIGNOR, BY MESNE ASSIGNMENTS, TO PITTSBURGH RESEARCH CORPORATION, OF PITTSBURGH, PENNSYLVANIA, A CORPORATION OF DELAWARE.

ELECTROTHERMIC REFINING OF METALS.

Application filed September 5, 1919. Serial No. 321,804.

*To all whom it may concern:*

Be it known that I, JOSEPH L. DIXON, a subject of the King of Great Britain, residing at New York, in the county and State of New York, have invented certain new and useful Improvements in Electrothermic Refining of Metals, of which the following is a full, clear, and exact description.

The invention upon which this application for Letters Patent is based pertains to the art of smelting steel or other like metals by means of the electric arc furnace, and is an improvement upon that part of the process which is carried out by the use of the electric arc wherein the molten steel is refined or freed from injurious or objectionable chemical elements.

The refining of steel in an electric arc furnace, as is well known, is carried out by the use of slags which have a great absorbing power or affinity under certain conditions for those impurities which it is sought to remove. For example, to eliminate sulfur from steel, a slag rich in lime is used.

In the process of refining metals as heretofore described, the electric energy delivered to the electrodes has generally been in the form of a current of low voltage but of large quantity. From the fact that this low voltage is barely sufficient to overcome the electrical resistance of the slag, the advantage results that most of the heat resulting from the electric current is developed in the slag itself, producing in this way a high local temperature therein. Such high local temperature has its advantages, because many of the chemical reactions by which the metal is purified are endothermic and can be caused to occur only at high temperatures. If a higher voltage be used with approximately the same energy input then a lesser proportion of the total voltage energy is expended in overcoming the electrical resistance of the slag, and in consequence, the necessary endothermic reactions do not occur as freely, even though the furnace as a whole be more highly heated.

On the other hand, the employment of a low voltage has certain disadvantages, mainly in that the more intense heat is localized, wherefore, while those parts of the slag immediately under the electrodes are excessively hot, the other parts are, or may be relatively cool. From this it results that the slag which is performing the refining, and which is generally highly infusible, is very largely in a semi-solid state, and hence, in the general mass of the slag the desired chemical reactions are impeded or retarded.

Again, this semi-solid state of the main body of the slag prevents liquid circulation and diffusion which would otherwise bring all parts of the slag, in turn, into the zones of intense heating which lie immediately under the electrodes.

By my improvement on the process thus above described, I overcome these objections by employing a plurality of electrodes and supply one or some of the same with electric current at low voltage, and the other or others with current at a relatively high voltage. By this means the low voltage electrode or electrodes produce the intense local heating of the slag, essential to the development of the necessary chemical reactions. While the electrodes of higher voltage radiate sufficient heat over the entire mass of material to create and maintain the required fluidity.

In illustration of the improved results which follow from the use of my process, I may say that I have found that in the well known process of deoxidizing and desulfurizing steel by means of coal or coke additions to a basic slag, it is possible to complete the refining without any excess of coke with a resulting harmful carburizing of the metal. I have also found that I can use a slag richer in lime and hence of greater refining powers, without retardation of the process due to lack of fluidity Any proper or convenient means may be employed to carry out my invention, but for purposes of illustration I have shown in the accompanying drawing, and which is purely diagrammatic, a furnace or crucible A, having three electrodes B, C and D. These electrodes are connected with the coils or windings E, F and G of a three phase transformer H, one of which as E, is designed to develop and deliver to the electrode C a higher voltage than that supplied to the others.

Other means for producing and delivering the currents of different voltage may be used, and the invention is limited neither in this respect nor in respect to the number nor character of the electrodes, provided one or more be supplied with a current of low voltage and the other or others with a current of relatively high voltage.

What I claim is:

1. The process of refining steel by means of an electric arc furnace having a plurality of electrodes which consists in supplying between one electrode and another current of low voltage and between other of said electrodes current of relatively high voltage.

2. In an apparatus for refining steel comprising a furnace with a plurality of electrodes for producing arcs, the combination with said furnace of sources of current connected to apply low voltage between one of said electrodes and another, and a relatively high voltage between other of said electrodes.

3. In an apparatus for refining steel comprising a furnace having three arcing electrodes, the combination with said furnace of sources of current connected to apply a relatively low voltage between two of said electrodes, and a relatively high voltage between each of said two electrodes and the third electrode.

4. The combination with an electric furnace having three arcing electrodes, of a source of current including a star-connected three phase winding connected to said electrodes, said winding being unsymmetrical or unbalanced, but having no neutral connection, whereby an unequal voltage is impressed upon the several electrodes.

In testimony whereof I hereunto affix my signature.

JOSEPH L. DIXON.